Figure 1:
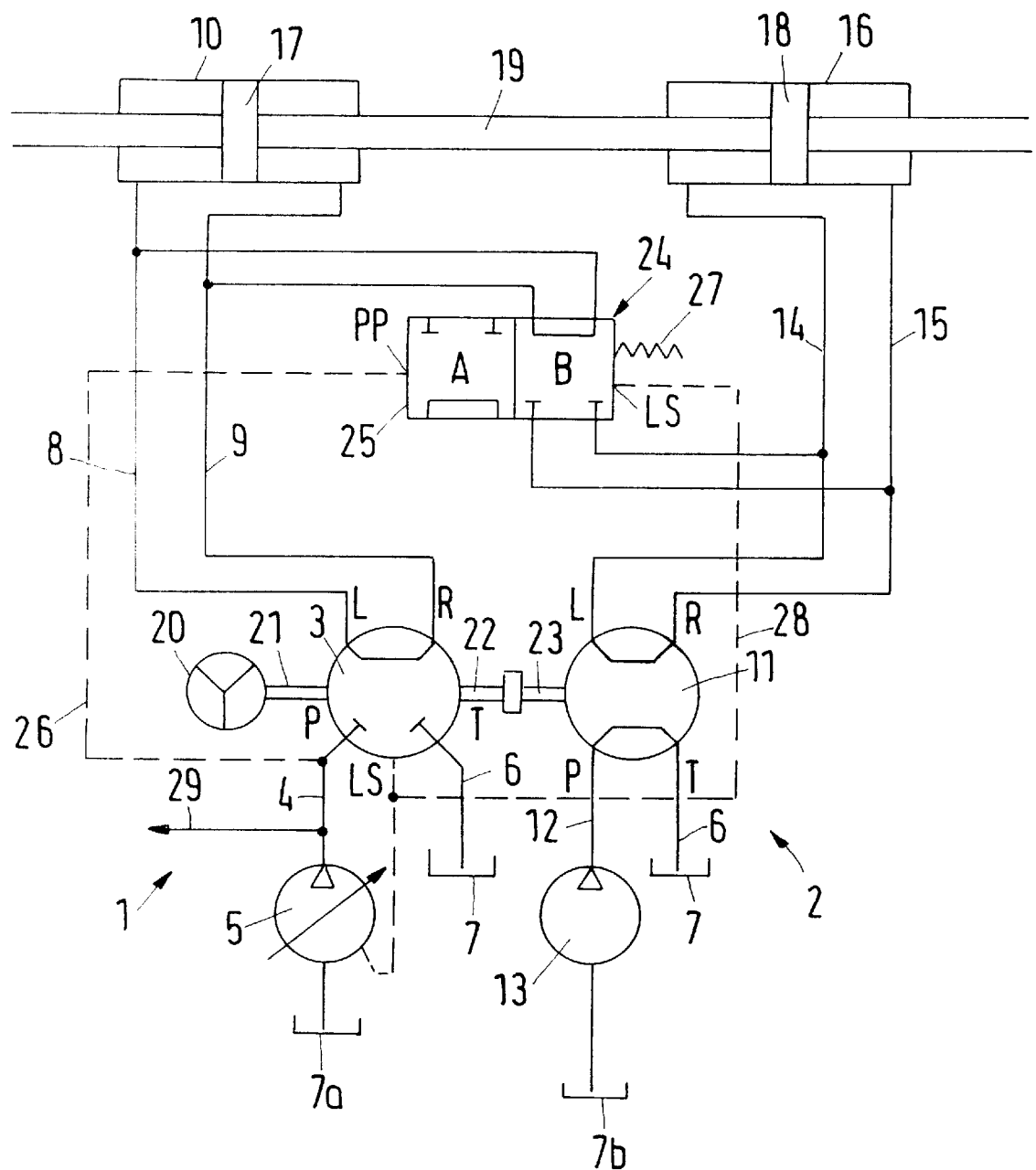

United States Patent [19]

Sørensen

[11] Patent Number: 6,131,389
[45] Date of Patent: Oct. 17, 2000

[54] HYDROSTATIC STEERING DEVICE WITH TWO STEERING SYSTEMS

[75] Inventor: Søren Nygaard Sørensen, Nordborg, Denmark

[73] Assignee: Danfoss Fluid Power A/S, Nordborg, Denmark

[21] Appl. No.: 09/202,050
[22] PCT Filed: Jun. 4, 1997
[86] PCT No.: PCT/DK97/00247
  § 371 Date: Dec. 7, 1998
  § 102(e) Date: Dec. 7, 1998
[87] PCT Pub. No.: WO97/47511
  PCT Pub. Date: Dec. 18, 1997

[30] Foreign Application Priority Data

Jun. 7, 1996 [DE] Germany .......................... 196 22 731

[51] Int. Cl.[7] .................................................. F16D 31/00
[52] U.S. Cl. .................................. 60/384; 60/405; 60/406
[58] Field of Search .............................. 10/384, 385, 386, 10/403, 405, 406

[56] References Cited

U.S. PATENT DOCUMENTS 3,896,617  7/1975  Kraina ........................................ 60/405
4,184,332  1/1980  Liebert ....................................... 60/403
4,184,560  1/1980  Tischer ....................................... 60/405
5,322,003  6/1994  Winyard et al. ........................... 60/403

*Primary Examiner*—F. Daniel Lopez
*Attorney, Agent, or Firm*—Lee, Mann, Smith, McWilliams, Sweeney & Ohlson

[57] ABSTRACT

A hydrostatic steering device having substantially identical first and second steering systems, each including a pump connected to a steering unit, which is connected to a steering motor by two motor hoses. A steering wheel is common to both steering units. The device includes a change-over valve which has an operation position hydraulically coupling together the two motor hoses of the second steering system, while hydraulically isolating from each other the two motor hoses of the first steering system, and an emergency position hydraulically coupling together the two motor hoses of the first steering system, while hydraulically isolating from each other the two motor hoses of the second steering system. A switching device switches the change-over valve from the operation position to the emergency position, when a fault occurs in the first steering system.

11 Claims, 2 Drawing Sheets

HYDROSTATIC STEERING DEVICE WITH TWO STEERING SYSTEMS

The invention concerns a hydrostatic steering device with two steering systems, each having a pump, a steering unit provided with an input shaft and a steering motor connected to the steering unit by means of two motor hoses, by which a steering wheel common for both steering units is provided, and both steering motors are mechanically connected with each other on the output side.

Such a steering device is known from DE 29 44 883 C2. The fact that all important components are available twice causes that on failure of one steering system, be it due to a pump failure or a hose damage, it is still possible to steer the vehicle by means of the remaining steering system. This is a condition for such vehicles to be permitted to drive at limited speed on public roads. However, it is a disadvantage that the driving of both steering units requires a relatively high torque.

The task of the invention is to provide a hydrostatic steering device of the kind mentioned in the introduction, by which the torque to be provided on the steering hand-wheel, both during normal operation and during emergency operation, has a relatively low value.

According to the invention, this task is solved by means of a change-over valve which, in an operation position, creates a hydraulic connection of the motor hoses of the second steering system, and in an emergency position, the motor hoses of the first steering system, leaving the motor hoses of the other steering system, respectively, in the separated state, and a switching device reacting on the occurrence of a fault in the first steering system and switching the change-over valve from the operation position to the emergency position.

With this construction, the motor hoses of the second steering system are short-circuited during normal operation, causing that the corresponding steering unit is operated together with the steering unit of the first steering system, however, due to the short-circuit working without pressure. Thus the torque required for the steering is only a little higher than the torque required for the activation of the steering unit of the first system. In most cases it will not even be higher than with one steering system, as the second steering unit can be operated by the first one. When the change-over valve switches to the emergency position, the second steering system is fully effective, whereas the motor hoses of the first steering system are short-circuited. The torque to be provided in case of emergency is thus only a little higher than the torque required for the operation of the second steering system. Thus the torque to be produced manually is in both cases relatively small, and only changes very little when switching from normal operation to emergency operation. An additional advantage is that—even if one steering system is always ineffective—both steering units are operated constantly, causing that, in case of emergency operation, there is no risk that the second steering unit jams and does not function.

For the fault-monitoring there are several opportunities. It is recommended that the switching device activates the change-over valve in dependence of the pressure conditions in the first steering system, as each fault leads to changed pressure conditions.

In a preferred embodiment it is provided that the switching device reacts when the difference between the input pressure of the first steering unit and the load pressure in the first steering system falls below a pre-set value. The input pressure drops to zero, when the pump of the first steering system fails or cannot provide fluid from the tank due to the loss of hydraulic fluid through a hose damage.

It is also advantageous for the change-over valve to have a slide, which is loaded in one end by the input pressure of the first steering unit and in the other end by the load pressure in the first steering system and a spring. In this way, change-over valve and switching device can be combined with each other.

Another recommendable alternative is for the change-over valve to be a solenoid valve supplied with inductor current from the switching device.

Preferably, when disconnecting the pump of the first steering system, the change-over valve switches to the emergency position. This means that on each operation start and each operation stop the change-over valve is operated. This secures that the change-over valve does not get jammed, but functions correctly.

It is recommended that one of the steering units has an output shaft arranged on the end of the housing opposite to the input shaft, said output shaft being connected to the input shaft of the other steering unit. Thus the two steering units can be arranged immediately next to each other, meaning that they will not need much space.

This is especially the case when the housings of both steering units are connected through a sleeve surrounding the connection spot and being provided with flanges. In this way both steering units can be connected and built into the vehicle as a block.

In this connection, it is also favourable, that the steering unit in the first steering system has a measuring motor, the rotor of which is driving the output shaft. As usual, this measuring motor serves the purpose of following up on a rotary slide in the steering unit. Further, it is used for the driving of the input shaft of the second steering unit, so that the driver of the vehicle does not have to provide additional torque for this purpose.

It is also advantageous that the measuring motor has a ring with internal teeth fixed in the housing and an orbiting gear wheel with external teeth, and that the output shaft is connected with the tooth wheel via a propeller shaft. Steering units having such a measuring motor have proved to be useful in practice. They are easily completed by the output shaft and its operation propeller shaft.

A further simplification is reached in that the housing of the change-over valve is placed on the housing of the first steering unit. In this way external hoses for the load pressure, the input pressure, and additional shares of the motor hoses can be saved.

In the following the invention is explained in detail on the basis of drawings of a preferred embodiment, showing:

FIG. 1 a block diagram of a steering device according to the invention

Figure 2:
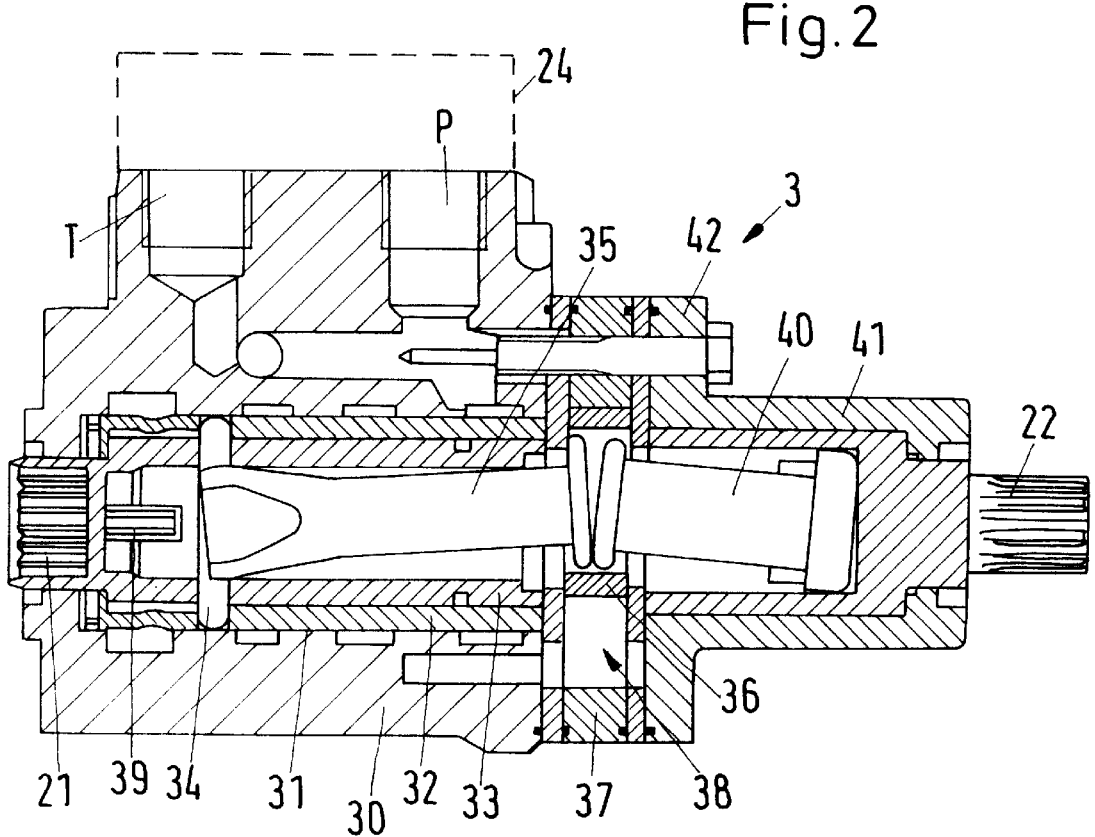
Figure 3:
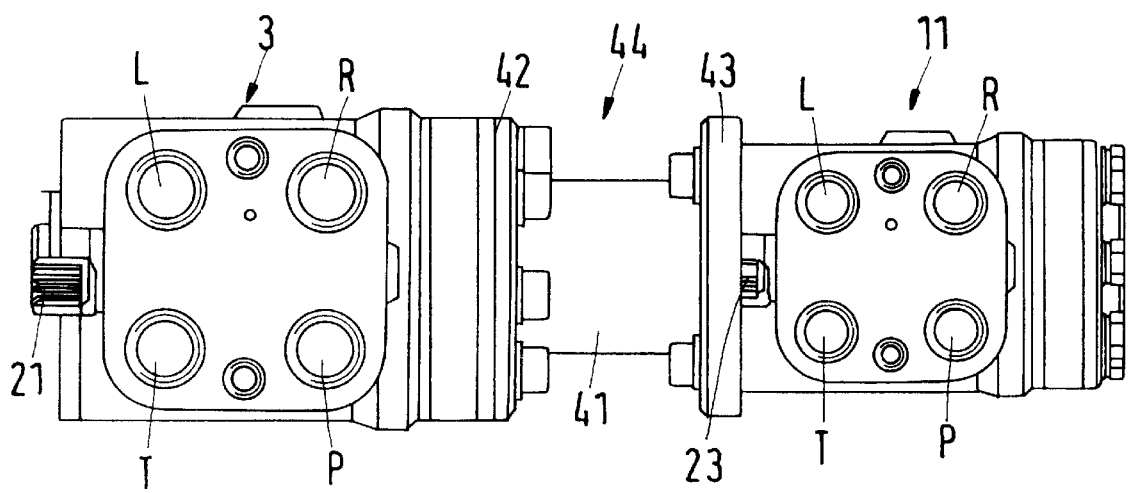

FIG. 2 an embodiment of the steering unit of the first steering system, shown in longitudinal section FIG. 3 a block comprising both steering units FIG. 1 shows a first steering system 1 and a second steering system 2. The first steering system 1 has a first steering unit 3, the pump input P of which is connected with a controllable pump 5 via a pump hose 4, and the tank input T of which is connected with the tank 7 via a tank hose 6. The two motor connections L and R are connected with a first steering motor 10 via each one motor hose 8 and 9. In a similar way, a second steering unit 11 is provided, the pump input P of which is connected with a pump 13, supplying a constant volume, via a pump hose 12, and the tank input T of which is connected with the tank 7 via a tank hose 6. The two motor connections L and R are connected with a second steering motor 16 via each one motor hose 14 and 15. The pistons 17 and 18 of the two steering motors 10 and 16 are connected with each other via a common piston rod 19, which also acts on the wheels to be steered (not shown). A steering handwheel 20 is connected with the input shaft 21 of the first steering unit 3. This steering unit 3 has an output shaft 22, which is connected with the input shaft 23 of the second steering unit 11.

A change-over valve 24 has two positions, viz. an operation position A, in which the motor hoses 14 and 15 of the second steering system 2 are connected with each other, and an emergency position B, in which the motor hoses 8 and 9 of the first steering system 1 are connected with each other. When switching, it is provided that no intermediate positions exist, in which the motor hoses of the two steering systems get in contact with each other. A slide serves as switching device 25. On one front end acts the input pressure sure PP, measured on the pump hose 4 and introduced via a pressure signal hose 26. On the opposite end acts a spring 27 and the load pressure LS, which is introduced by the LS connection of the first steering unit 3 via a pressure signal hose 28, and which also influences the quantity supplied by the first pump 5.

The pump 5 can also supply additional consumers, if occasion should arise also through interconnection of a priority valve. Further, the tank 7a, from which the first pump 5 draws pressure fluid, is arranged at a higher level than the tank 7b, from which the second pump 13 draws pressure fluid.

This leads to the following mode of operation: When the steering device is activated, i.e. both pumps 5 and 13 are put into operation, the power from the input or pump pressure PP overrules the power of the spring 27 and the power from the load pressure LS, so that the change-over valve 24 switches to operation position A. This means that in the first steering system 1 the steering unit 3 supplies to the steering motor 10 an amount of pressure fluid corresponding to the rotation angle. The second steering unit 11 is supplied with pressure fluid from the pump 13, however exerts no forces on the steering motor 16, as both motor hoses 14 and 15 are short-circuited. Thus the operation of the second steering unit 11 requires no or almost no additional torque on the steering handwheel 20.

When the pump 5 fails, or when the motor hoses 8 and 9 supply no more fluid, e.g. because of hose damage, the input pressure PP falls heavily, causing the change-over valve 24 to switch to the emergency position B. Now the second steering system 2 is fully effective, whereas the first steering unit 3 is short-circuited on the motor side. Due to this, the torque required to operate the steering handwheel 20 is only a little higher than the torque required to operate the second steering unit. Also when the tank 7a of the first pump 5 is completely emptied due to a hose damage, the second pump 11 can work securely, as its tank 7b, or its inlet is at a lower level, meaning that pressure fluid for the second steering system is available.

An automatic switching from the operation position A to the emergency position B causes a change from steering system 1 to steering system 2; however the torque required for the steering remains almost the same. As the change-over valve 24 is activated on each start and stop of the steering device, and the steering unit 11 is activated on each operation of the steering handwheel 20, it is secured that in case of emergency the change-over valve 24 and the steering unit 11 will always be functionable.

Preferably, the steering units 3 and 11 have an embodiment as the one known from the Danfoss-Orbitol steering devices types OSPB and OSPC or from the DE 29 44 883 C2 mentioned in the introduction, by which the steering unit 3 is completed by an output shaft. FIG. 1 shows the steering unit 11 as an open-centre non-reaction type, and the steering unit 3 as a closed-centre non-reaction type. However, it is also possible to use steering units of the types open-centre non-reaction or closed-centre non-reaction. The pump 13 can also be a variable pump.

FIG. 2 shows a section through such a steering unit 3. In a housing 30 there is a bore 31, in which an external rotary slide 32 and an internal rotary slide 33 are arranged. The internal rotary slide 33 is connected with the input shaft 21. The external rotary slide 32 is connected with a propeller shaft 35 via a pin 34, which propeller shaft meshes with an externally toothed tooth wheel 36. Together with an internally toothed tooth ring 37 this forms the measuring motor 38. Springs 39 provide that the two rotary slides 32 and 33 can be displaced in relation to each other by a predetermined angle, however will remain in a neutral middle position when the steering handwheel 20 is not operated. When the steering handwheel 20 is turned, pressure fluid flows, depending on the turning direction, via the motor hoses 8 or 9 into the steering motor 10, by which the pressure fluid flows through the measuring motor 38, which causes the external rotary slide 32 to follow up on the internal rotary slide 33 in the rotation direction.

A propeller shaft 40 provides an unrotatable connection between the tooth wheel 36 and the output shaft 22. This is enclosed by a sleeve 41 flanged onto the housing 30 by means of a flange 42. Always then, when the measuring motor 38 is activated because of a rotation of the internal rotary slide 33 and displaces the external rotary slide 32, the output shaft 22 is also taken along, without requiring an additional torque to be applied on the steering hand-wheel from the input side.

Further, the dotted line shows how the change-over valve 24 can be mounted on the housing 30. Therefore, the pressure signal hoses 26 and 28 do not have to be mounted outside the steering unit 3. Also the two motor hoses 8 and 9 are mounted in the housing, which gives the shortest distance to the change-over valve 24. Alternatively, the change-over valve can be mounted on the housing of the second steering unit.

FIG. 3 shows the steering unit 3 to the left and the steering unit 11 to the right. The difference in relation to FIG. 2 is that the sleeve 41 has a second flange 43, with which it is flanged onto the housing of the second steering unit 11. This gives a standardised block 44, by which the sleeve 41 and the flange 43 are partly enclosing the connection spot, formed by the insertion of the externally toothed head of the output shaft 33 into the internally toothed head of the input shaft 23. Of course the two steering units 3 and 11 can also be oriented in relation to each other via a connection device engaging the housing on the outside.

Of course the hydrostatic steering device according to the invention can also be made with other known steering units. The change-over valve 24 can also be designed otherwise, especially as a solenoid valve, controlled electrically. In this case, e.g. a pressure measuring device can be provided, emitting an inductor current during normal operation, but interrupting it when a fault occurs. Such pressure measuring devices can also be used to show which of the steering systems is active.

What is claimed is:

1. Hydrostatic steering device with first and second steering systems, each having a pump, a steering unit provided with an input shaft and a steering motor connected to the steering unit by means of two motor hoses, a steering wheel common for both steering units, both steering motors being mechanically connected with each other on an output side, a change-over valve having an operation position creating a hydraulic connection of the motor hoses of the second steering system, leaving the motor hoses of the first steering system in a separated state, an emergency position, creating a hydraulic connection of the motor hoses of the first steering system, leaving the motor hoses of the second steering system in a separated state, and a switching device reacting on the occurrence of a fault in the first steering system and switching the change-over valve from the operation position to the emergency position.

2. Steering device according to claim 1, in which the switching device activates the change-over valve in dependence on pressure conditions in the first steering system.

3. Steering device according to claim 2, in which the switching device activates when the difference between input pressure of the first steering unit and load pressure in the first steering system falls below a pre-set value.

4. Steering device according to claim 3, in which the change-over valve has a slide, which is loaded at one end by the input pressure of the first steering unit and at the other end by the load pressure in the first steering system and a spring.

5. Steering device according to claim 1, in which the change-over valve comprises a solenoid valve supplied with inductor current from the switching device.

6. Steering device according to claim 1, in which when the change-over valve switches to the emergency position it disconnects the pump of the first steering system.

7. Steering device according to claim 1, in which one of the steering units has an output shaft located opposite to its input shaft, said output shaft being connected to an input shaft of the other steering unit.

8. Steering device according to claim 7, in which housings of both steering units are connected through a sleeve surrounding the connection and having flanges.

9. Steering device according to claim 1, in which the steering unit in the first steering system includes a measuring motor having a rotor driving an output shaft of the first steering system.

10. Steering device according to claim 9, in which the measuring motor has an internally toothed tooth ring fixed in a housing for the first steering unit and an orbiting externally toothed tooth wheel, the output shaft being connected with the tooth wheel via a propeller shaft.

11. Steering device according to claim 1, in which the change-over valve has a housing located on a housing of the first steering unit.

* * * * *